United States Patent [19]

Kondo et al.

[11] 4,062,999
[45] Dec. 13, 1977

[54] SYNTHETIC ORGANIC FIBERS COATED WITH AN AMINO SILANE AND AN EPOXY SILOXANE CONTAINING TREATING AGENT

[75] Inventors: Takamitsu Kondo; Mikio Tashiro, both of Matsuyama, Japan

[73] Assignee: Teijin Limited, Osaka, Japan

[21] Appl. No.: 641,286

[22] Filed: Dec. 16, 1975

Related U.S. Application Data

[60] Division of Ser. No. 604,047, Aug. 12, 1975, Pat. No. 3,980,599, which is a continuation-in-part of Ser. No. 546,906, Feb. 4, 1975, abandoned.

[30] Foreign Application Priority Data

Feb. 12, 1974  Japan .................................. 49-16312

[51] Int. Cl.$^2$ .......................... B32B 9/00; D02G 3/00
[52] U.S. Cl. .................................... 428/391; 428/375; 428/394; 428/395
[58] Field of Search ............... 428/375, 378, 391, 394, 428/395; 260/29.2 M, 46.5 E, 46.5 Y, 825; 252/8.6; 427/386

[56] References Cited

U.S. PATENT DOCUMENTS

| | | | |
|---|---|---|---|
| 3,055,774 | 9/1962 | Gilkey | 260/29.2 M |
| 3,341,356 | 9/1967 | Collier | 428/391 |
| 3,455,877 | 7/1969 | Plueddemann | 260/46.5 Y |
| 3,655,420 | 4/1972 | Tichenor | 428/391 |
| 3,904,805 | 9/1975 | Johnson et al. | 428/391 |
| 3,944,707 | 3/1976 | Foley et al. | 428/391 |
| 3,952,134 | 4/1976 | Watson | 428/391 |

*Primary Examiner*—Lorraine T. Kendell
*Attorney, Agent, or Firm*—Sherman & Shalloway

[57] ABSTRACT

A treating agent for filling synthetic fibers, said treating agent comprising (a) 1 part by weight of a specific substituted aminosilane of the formula

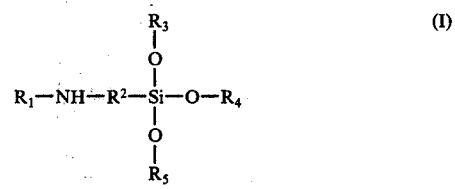

and (b) 1 to 20 parts by weight of a specific epoxysiloxane containing at least one structural unit of the formula

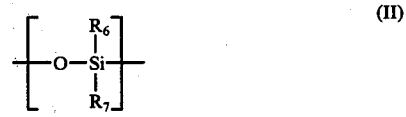

and at least two structural units of the formula

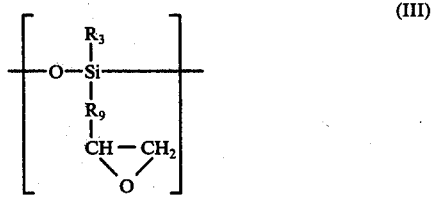

A method for treating synthetic fibers with the above treating agent. Synthetic fibers treated with the above treating agent suitable for use as fillings for quilts.

9 Claims, No Drawings

SYNTHETIC ORGANIC FIBERS COATED WITH AN AMINO SILANE AND AN EPOXY SILOXANE CONTAINING TREATING AGENT

This application is a division of application Ser. No. 604,047, filed Aug. 12, 1975, now U.S. Pat. No. 3,980,599, which in turn is continuation-in-part of Ser. No. 546,906 filed Feb. 4, 1975 now abandoned.

This invention relates to a treating agent for synthetic fibers for use as filling or stuffing, a process for treating synthetic fibers with such treating agent, and to synthetic fibers for filling obtained by treatment with the treating agent. More specifically, the invention relates to a treating agent for filling synthetic fibers which have superior compression elasticity, slickness, suppleness, soft feel similar to feather quilt, and wearing fitness, a process for treating synthetic fibers with such treating agent, and to filling synthetic fibers obtained by treatment with the treating agent.

Cotton and feathers have been the chief conventional filling for bed quilts or the like, and because of especially superior compression elasticity, slickness, suppleness and feel of the feathers, bed quilts using feathers as filling have been used as luxuries.

In recent years, such filling has been superseded by synthetic fibers such as polyester fibers or polypropylene fibers. However, fillings composed of such synthetic fibers have inferior compression elasticity, slickness, suppleness and feel to feathers, and present poor fitness to the body when used in bed quilts.

It has been attempted to produce luxury bed quilts having good compression elasticity and soft feel by changing the fibrous arrangement of the filling using synthetic fibers. For example, an attempt was made to use synthetic fibers in the form of tows instead of staples. However, this proposed method does not result in a substantial change of the properties of the fibers, and bed quilts obtained are not comparable to the feather quilts although exhibiting better compression elasticity, suppleness and feel than bed quilts using the conventional synthetic fiber fillings in staple form. In addition, this method has another defect in that since the fibers are used in tow form, conventional methods for producing bed quilts cannot be applied as such.

Without any effective and decisive solution to the problem, the current practice is to use synthetic fiber fillings treated with a treating agent composed chiefly of a surface active agent. For example, Japanese Laid-Open patent application No. 67592/73 discloses a treating agent composed of 80 to 60% by weight of a potassium salt of an ethylene oxide (2 mols) added lauryl phosphoether and 40 to 20% by weight of a propylene glycol ethylene oxide random copolymer having an average molecular weight of 24,000 in which 5 mols of ethylene oxide adds to 1 mol of propylene glycol. Synthetic fiber fillings treated with this treating agent cannot possess compression elasticity, suppleness and feel similar to feathers.

We therefore attempted to treat synthetic fibers for filling with the synthetic textile fiber treating agents which were previously proposed with a view to impart slickness and suppleness similar to animal fibers such as alpaca and mohair to synthetic fibers. For example, we used the treating agent disclosed in U.S. Pat. No. 3,655,420 to Robert L. Tichenor, which is a mixture of about 0.3 to 20 parts by weight of a liquid epoxysiloxane and 1 part by weight of an amine compound containing at least two amino groups per molecule and not more than one aromatic ring directly bonded to the nitrogen atom.

Although this mixture imparts superior compression elasticity, slickness and suppleness to synthetic fibers, it has the serious defect that because of its strong activity, this mixture has poor storage stability; when allowed to stand in the form of emulsion, it gradually undergoes cross-linkage at room temperature, and in about 2 or 3 days, it is degenerated. When this treating agent is used recyclically, it does not ensure a uniform treatment because of the crosslinking that occurs at an elevated temperature during the operation, and the cross-linked treating agent often adheres firmly to rollers or other treating devices, making it necessary to interrupt the operation frequently.

Accordingly, a primary object of this invention is to provide a treating agent for synthetic fibers which gives synthetic fiber fillings having superior properties such as compression elasticity, slickness, suppleness, soft feel and wearing fitness.

Another object of this invention is to provide a process for treating filling synthetic fibers using such a treating agent.

Still another object of this invention is to provide filling synthetic fibers treated with the above treating agent and having superior compression elasticity, slickness, suppleness, feed and wearing fitness which give bed quilts comparable to feather quilts.

A further object of this invention is to provide bed quiltings having the above superior properties.

Other objects of this invention along with its features and advantages will become apparent from the following description.

According to this invention, there is first provided a treating agent for filling synthetic fibers comprising a. 1 part by weight of an aminosilane of the following formula (I)

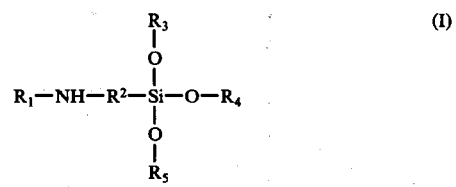

wherein $R_1$ is a hydrogen atom, an alkyl group containing 1 to 4 carbon atoms or a phenyl group, $R_2$ is an alkylene group containing 1 to 4 carbon atoms, and $R_3$, $R_4$ and $R_5$, independently from each other, represent an alkyl group containing 1 to 4 carbon atoms, and b. 1 to 20 parts by weight of an epoxysiloxane containing at least one structural unit of the formula (II)

wherein $R_6$ and $R_7$, independently from each other, represent an alkyl group containing 1 to 3 carbon atoms, and at least two structural units of the formula (III)

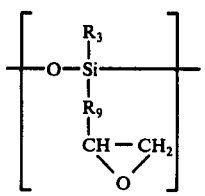

(III)

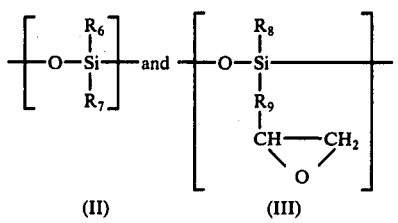

(II)  (III)

is used in combination with the aminosilane of formula (I). In the above formulae, the alkyl groups represented by $R_6$, $R_7$ and $R_8$ have 1 to 3 carbon atoms and may either be of straight chain or branched chain. The alkyl groups include methyl, ethyl, and n- or iso-propyl groups, of which a methyl group is especially suitable. The alkylene group represented by $R_9$ may either be of straight chain or of branched chain, and contains 2 to 5 carbon atoms. For example, it includes ethylene, propylene, butylene, and pentylene groups, of which ethylene and propylene groups are especially preferred. $R_9$ may also be an arylene group, for example, phenylene and naphthylene groups.

The group $R_8$ can also represent the group

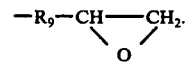

This means that the epoxysiloxane used in this invention can also contain a structural unit of the following formula

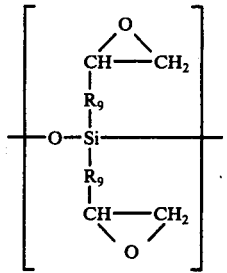

(IV)

The epoxysiloxane that can be used in this invention needs to contain at least one each of the recurring units of formulae (II) and (III), preferably at least 35, and more preferably 100 to 600, such units in total, and at least two, preferably 4 to 20, of them must be recurring units of formula (III).

Usually, the recurring units (II) and (III) and/or (IV) can be present at random in the epoxysiloxane, but may also be present in a block form. A small amount of another recurring unit may be present in it so long as it does not considerably change the basic properties of the epoxysiloxane. The terminal groups can usually be trialkylsilyl or hydroxyalkylsilyl groups, but also silicon-free groups may be used. When the molecules form a ring, the absence of terminal groups is also possible.

Desirably, the epoxysiloxane used in the treating agent of this invention is liquid and has a high molecular weight. Usually, it is advantageous to use epoxysiloxane having a viscosity at 25° C. of 1,000 to 100,000 centistokes, preferably 2,000 to 50,000 centistokes, most preferably 3,000 to 20,000 centistokes.

wherein $R_8$ is an alkyl group containing 1 to 3 carbon atoms or the group

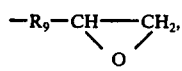

$R_9$ being an alkylene group containing 2 to 5 carbon atoms or a substituted or unsubstituted arylene group containing 6 to 10 carbon atoms.

The above treating agent has an effect of markedly reducing the coefficient of friction of synthetic fibers for filling, and give synthetic fiber fillings having superior compression elasticity, slickness, suppleness, feel and wearing fitness comparable to, or excelling, feather quilts.

In the aminosilane of formula (I), the alkyl and alkylene groups may either be of straight chain or branched chain, and include, for example, methyl, ethyl n- or iso-propyl, n-, iso- or tert-butyl, methylene, ethylene, n- or iso-propylene, and n-iso- or tert-butylene groups. Methyl and ethyl groups are especially preferred as the alkyl group, and ethylene and propylene groups are especially preferred as the alkylene group.

Some of the aminosilanes of formula (I) used in this invention are known compounds, and even novel aminosilanes of the above formula can be prepared in quite the same manner as the methods for preparing the known aminosilanes.

Suitable aminosilanes include, for example, aminomethyltrimethoxysilane,
β-aminoethyltrimethoxysilane,
β-aminoethyltriethoxysilane,
γ-aminopropyltrimethoxysilane,
γ-aminopropyltriethoxysilane,
δ-aminobutyltriethoxysilane,
β-methylaminoethyltriethoxysilane,
β-ethylaminoethyltriethoxysilane,
γ-methylaminopropyltrimethoxysilane,
γ-propylaminopropyltriethoxysilane,
γ-ethylaminobutyltriethoxysilane,
γ-phenylaminopropyltrimethoxysilane, and
γ-phenylaminopropyltriethoxysilane.

Of these, γ-aminopropyltriethoxysilane [$H_2NC_3H_6Si(OC_2H_5)_3$], γ-aminopropyltrimethoxysilane [$H_2NC_3H_6Si(OCH_3)_3$], β-methylaminoethyltriethoxysilane [$CH_3NHC_2H_4Si(OC_2H_5)_3$] and γ-phenylaminopropyltrimethoxysilane [$Ph-NHC_2H_6Si(OCH_3)_3$] are preferred. The γ-aminopropyltriethoxysilane is especially preferred.

In the treating agent of this invention, an epoxysiloxane having the following recurring units Preferably, the epoxisiloxanes used in this invention contain at least 0.6% by weight of expoxy groups based on their total weight. The upper limit of the epoxy group content is not critical, but usually, the amount of the epoxy groups is 0.6 to 10% by weight, preferably 1 to 5% by weight based on the total weight of the epoxy siloxane.

Epoxysiloxanes known per se can be used in this invention. For example, epoxysiloxanes of the type disclosed in the specification of U.S. Pat. No. 3,055,774 are useful.

The epoxy siloxanes must be water-soluble or readily dispersible in water for convenience of use, but if desired, can be used in an organic solvent or in the absence of solvent.

The epoxysiloxane described above can be used in a proportion of 1 to 20 parts by weight, preferably 1 to 18 parts by weight, more preferably 2 to 10 parts by weight, and most preferably 5 to 10 parts by weight, per part by weight of the aminosilane of formula (I).

By adhering the treating agent of this invention to filling synthetic fibers, various characteristics suitable for filling purposes, such as superior compression elasticity, slickness, suppleness, feel and wearing fitness can be imparted to the synthetic fibers.

Thus, according to this invention, there is provided a process for treating synthetic fibers for filling, which comprises applying a treating agent comprising 1 part by weight of an aminosiloxane of the above formula (I) and 1 to 20 parts by weight of an epoxysiloxane containing at least one structural unit of the above formula (II) and at least two structural units of the above formula (III) and/or (IV) to synthetic fibers for filling, and then heat-treating the fibers.

Adhering of the treating agent of this invention to filling synthetic resin can be performed by various known methods. The time of application may be before or after a step of drawing synthetic fibers as-extruded, before or after a step of a crimping treatment, before or after a step of bulking, before or after the above heat-treatment step, or before or after a step of staple formation (cutting).

The treating agent can be used in the form of a solution in an organic solvent, but usually, it is advantageous to use it in the form of an aqueous dispersion, especially an aqueous emulsion. The concentration of the aminosilane and the epoxy siloxane in such a solution or dispersion can be varied over a wide range. The suitable concentration is 0.5 to 20% by weight, preferably 1 to 15% by weight based on the weight of the solution or dispersion. It should be understood that this concentration range, however, is not strictly critical, but depending upon the method of application, the type of synthetic fibers, etc., concentrations outside the above range can also be employed.

Application of the treating agent to synthetic fibers can be performed by various means such as a dipping method, an oiling roller coating method or a spray method. This results in the adhering or impregnating of the treating agent of this invention to or in the synthetic fibers.

The amounts of the aminosilane and epoxysiloxane to be applied to fibers can be varied over a wide range according to the specific effect desired. Generally, it is suitable to apply them in a total amount, based on the dry weight of the fibers, of at least 0.1% by weight. The upper limit is not particularly set, but the use of too large amounts does not bring about a corresponding effect, and is therefore uneconomical. Usually, the total amount of the aminosilane and the epoxy siloxane applied is suitably not more than 3% by weight, preferably 0.2 to 1.5% by weight, more preferably 0.3 to 1.0% by weight, based on the dry weight of the fibers.

When the treating agent of this invention is used in the form of an emulsion, an emulsifier or an antistatic agent, etc. can be blended in order to facilitate the dispersion of the effective components. Examples of preferred emulsifiers and antistatitc agents are anionic surface active agents such as polyoxyethylene alkyl aryl ethers, polyoxyethylene alkyl ethers, polyoxyethylene sorbitan alkyl amides, polyvinyl alcohol, or their analogs, or alkyl phosphate potassium salts; and cationic surface active agents such as quaternary ammonium salts (e.g., stearyl dimethyl benzyl ammonium chlorideX, or stearylamide propyldimethyl 3-hydroxyethyl ammonium nitrate.)

After applying the treating agent of this invention to fibers preferably at a temperature of not more than 50° C., the fibers are heat-treated to cure and cross-link the aminosilane and the epoxysiloxane in the treating agent on the surface of the fibers. This imparts markedly improved compression elasticity, slickness, suppleness, feel, and wearing fitness to the fibers. This heat-treatment also markedly improves the washing resistance of the fibers. The treating temperature varies according to the treating time, and cannot be unequivocally determined. If the temperature is too low, long periods of time are required to accomplish the heat-treatment and the effect obtained is not sufficient. On the other hand, if it is too high, the properties of the fibers are deteriorated. Thus, generally, the heat-treating temperature is at least 100° C but below the melting point (or softening point) of the synthetic fibers, and temperatures of 100° to 230° C are especially suitable. The heat-treating time is at least 1 second, and can be varied over a wide range according to the heat-treating temperature. When relatively high temperatures are used, it is advantageous to stop the heat-treatment within a short period of time that does not cause the deterioration of the properties of the fibers. When polyethylene terephthalate fibers are used, a period of about 10 minutes to 2 hours is suitable at a temperature of 110° to 170° C., and a period of 1 second to 10 minutes is most suitable when the temperature is 170° to 230° C.

When the synthetic fibers treated by this invention are used as fillings, the fibers need to be crimped. The crimping treatment can be carried out before, during or after the treatment of the fibers in accordance with this invention. It is preferred to crimp synthetic fibers to which the treating agent of this invention has been applied, before the heat-treatment in accordance with this invention. This has the advantage that both of the heat curing of the treating agent and the heat-setting of the crimps can be performed at the same time.

The crimping treatment can be carried out by various methods, for example, mechanical crimping methods using a stuffer crimper, a gear crimper, etc., or latent crimp-forming methods in which the crimps are developed by heat-treatment or chemical treatment.

Usually, the fibers so treated are cut to suitable lengths.

Alternatively, the crimping treatment can be carried out after the treatment of fibers in accordance with the method of this invention. Or it is also possible to apply the treating agent of this invention to fibers obtained by first crimping synthetic fibers and then, if desired, cutting them.

There is no particular limitation on the type of synthetic fibers to which the treating agent and the treating method of this invention can be applied, and examples of suitable synthetic fibers are polyester, polyamide, polyacrylic and polyolefin synthetic fibers. The polyester fibers are especially suitable.

Thus, according to this invention, synthetic fibers coated with a heat-treated product of the aminosilane and the epoxysiloxane are obtained which have superior compression elasticity, slackness, and suppleness and a soft feel. When these fibers are used as a filling of bed quilts, they show a soft feel like feather quilts and afford good wearing fitness.

The synthetic fibers treated by the method of this invention and crimped and optionally cut can be utilized as fillings or stuffing of bed quilts, pillows or other quilts, etc. It has been found that when the synthetic fibers satisfy the following properties, fillings of superior quality can be provided by the favorable interaction between the properties of the fibers and the treatment of this invention.

$$1.5 \leq D \leq 10$$

$$10D - 20 \leq L \leq 10D + 60$$

$$10 \leq L$$

$$-\tfrac{1}{2}D + 10.0 \leq C_N \leq -\tfrac{1}{2}D + 15.5$$

$$15 \leq C_N + C_D \leq 32$$

wherein
D is the denier size of the synthetic fibers;
L is the length of the fibers in mm,
$C_N$ is the number of crimps per 25 mm, and
$C_D$ is the percent crimp (%) (measured by the method described in JIS L-1074).

Synthetic fibers, especially polyester fibers, having the above properties and treated with the treating agent of this invention exhibit not only superior compression elasticity, slickness, supplenesss, feel and wearing fitness, but all properties required of fillings of stuffings such as a highest degree of handling properties by the above synergistic effect.

The denier (D) of the fibers is preferably 1.5 to 10 denier in view of the bulkiness of the filling and its handling properties (e.g., the occurrence of neps in processing on cards). If suppleness is considered, the especially preferred denier size of the fiber is 2 to 8 denier. When filling is prepared, fibers of different denier sizes as well as the same sizes can be used.

If the length (L mm) of the fibers is too short, intertwining of the fibers is reduced at the time of producing fillings, and web breakage tends to occur. If it is too long, the fibers tend to wrap around cylinders of cards, and also to develop neps. In other words, the handling properties of the fibers are degraded. Accordingly, it is preferred that the length of the fibers should be:

$$10D - 20 \leq L \leq 10D + 60$$

$$10 \leq L,$$

especially preferably $$10D - 10 \leq L \leq 10D + 50$$

$$30 \leq L.$$

As a measure for crimp characteristics, the number of crimps ($C_N$, number/25 mm) and percent crimp ($C_D$, %) are preferably within the following range $$-3/ + 10.0 \leq C_N \leq -\tfrac{1}{2} + 15.5$$

$$-\tfrac{1}{2}15 \leq C_N + C_D \leq 32$$

more preferably within the following range $$-\tfrac{1}{2}D + 11.0 \leq C_N \leq -\tfrac{1}{2}D + 14.5$$

$$18 \leq C_N + C_D \leq 30.$$

If the crimp properties are below the lower limits of the above-specified ranges, the handling properties of filling tends to be deteriorated, and if they exceed the upper limits, the slickness of filling tends to be reduced. These crimp characteristics can be easily imparted by, for example, conventional stuffer crimpers.

The treating agent of this invention can be equally applied to synthetic fibers used as filling in the form of tow.

Synthetic fibers to which the treating agent of this invention has been applied, and which, if desired, have been heat-treated and crimped possess very superior compression elasticity, slickness, suppleness, feel and wearing fitness, and have a wide range of utility as a filling or stuffing material. When, for example, a bed quilt is prepared using these synthetic fibers, it exhibits superior feel and fittness to the body comparable to or excelling those of feather quilts. If a pillow or a winter garment is produced using these sythetic fibers, it fits well to the body.

The treating agent of this invention described above affords filling synthetic fibers having superior compression elasticity, slickness, suppleness, feel and wearing fitness which have not been provided by the conventional synthetic fibers, and can be applied not only to filling purposes, but also to other fields which require the above characteristics. Accordingly, the treating agent of this invention offers a great commercial significance.

The following Examples further illustrate the present invention in greater detail. In the Examples, all parts are parts by weight, and all viscosity values are expressed by centistokes at 25° C. The compression elasticity, slickness and suppleness were evaluated by the following methods.

Compression elasticity

This is an important characteristic as filling. Especially in the case of bed quilts the compression rate becomes a measure for the fittability to the body. It expresses the deformability of the fibers to the stress on the bedding. The higher the compression rate, the more deformable the fibers are in a bed quilt.

The compression elasticity is evaluated as follows:
A web is prepared by processing raw fibers on a card, and a sample having a cylindrical shape with a diameter of 10 cm and a weight of 20 g is made. A disc-like light load (0.5 g/cm$^2$) and a disc-like heavy load (9.5 g/cm$^2$) are placed on the sample and compressed for 10 minutes, after which the light and heavy loads are removed, and the sample is left to stand for 2 hours. Again, the light and heavy loads are placed on the sample, and it is allowed to stand for 17 hours. The light and heavy loads are then removed, and after a lapse of 7 hours, only the light load is placed on the sample. The height ($h_o$) of the sample at this time is measured. Again, the light and heavy loads are placed on the sample, and it is left to stand for 17 hours. The height ($h_1$) of the sample at this time is emeasured. Then, the light and heavy loads are removed. After a lapse of 7 hours, only the light load is replaced and the height ($h_2$) of the sample is measured.

The compression rate (%) and the compression recovery (%) are calculated from the following equations.

$$\text{Compression rate (\%)} = \frac{h_0 - h_1}{h_0} \times 100$$

$$\text{Compression recovery (\%)} = \frac{h_2 - h_1}{h_0 - h_1} \times 100$$

In order for the filling to provide soft feel and wearing fitness similar to feather quilts, it is preferred that the compression rate is at least 70%, and the compression recovery is at least 90%.

Slickness

The slickness is evaluated by the coefficient of static friction ($\mu s$) between fiber and fiber and the coefficient of dynamic friction ($\mu d$) between fiber and fiber at a speed of 3 m/min. which are measured by the Roeder method at a temperature of 20° C. and a relative humidity of 65%. The smaller the $\mu s$ and $\mu d$ values, the better is the slickness. Preferably, both of the $\mu s$ and $\mu d$ values are not more than 0.25.

Feel

A sensual test is conducted for the feel of the filling in accordance with this invention. 2.0 Kg of raw fibers spread on a card are uniformly placed in a bag of a belt quilt cloth with a size of 140 cm × 200 cm. The feel is evaluated both by hand and by wearing.

EXAMPLE 1

Polyethylene terephthalate having an intrinsic viscosity, as calculated from the measured value in o-chlorophenol at 35° C., was melt-spun. The resulting tow with a total denier of 400,000 (a single fiber denier of 6) was dipped in a treating agent of each of the recipes shown in Table 1 as an aqueous emulsion, squeezed by a stuffer crimper to a pick-up of 10%, and dried at 90° C. for 20 minutes. Then, the two was heat-treated at 140° C for 30 minutes, and cut to a fiber length of 76 mm.

The properties of the fibers obtained are shown in Table 2. The number of crimps was 7 per 25 mm, and the percent crimp was 18% in all cases.

TABLE 1

| Composition | Treating agents (parts) | | | |
|---|---|---|---|---|
| | A | B | C | D |
| γ-Aminopropyl triethoxysilane | 0.5 | | | |
| γ-Aminopropyl trimethoxysilane | | 0.5 | | |
| β-methylaminoethyl triethoxysilane | | | 0.5 | |
| γ-Phenylaminopropyl trimethoxysilane | | | | 0.5 |

TABLE 1-continued

| Composition | Treating agents (parts) | | | |
|---|---|---|---|---|
| | A | B | C | D |
| Epoxysilane - (1)* | 4.9 | 4.9 | 4.9 | 4.9 |
| Cetyl phosphate potassium salt | 1.1 | 1.1 | 1.1 | 1.1 |
| Polyoxyethylene (10 mols) nonylphenol ether | 0.5 | 0.5 | 0.5 | 0.5 |
| Water | 93.0 | 93.0 | 93.0 | 93.0 |

The epoxysiloxane —(1)* used above consisted of structural units of the following formulae

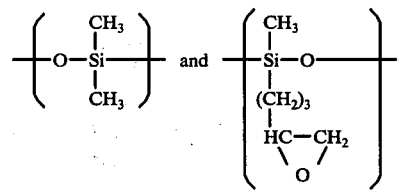

and had a viscosity of 6,000 centistokes at 25° C., an epoxy group content of 1% by weight with both ends being trimethylsilyl groups [—Si(CH$_3$)$_3$].

TABLE 2

| Treating agent | A | B | C | D |
|---|---|---|---|---|
| Slickness | | | | |
| $\mu s$ | 0.17 | 0.17 | 0.18 | 0.19 |
| $\mu d$ | 0.16 | 0.17 | 0.17 | 0.20 |
| Compression elasticity | | | | |
| Compression rate | 79 | 78 | 77 | 75 |
| Compression recovery | 99 | 99 | 97 | 95 |
| Feel | Very similar to feather quilt | | | |

COMPARATIVE EXAMPLE 1

A mixture of 60% by weight of a potassium salt of ethylene oxide (2 mols)-added laurylphosphoether and 40% by weight of a propylene glycol/ethylene oxide random copolymer having an average molecular weight of 24,000 in which 5 mols of ethylene oxide added to 1 mol of propylene glycol was formed into a 2% aqueous emulsion. The same polyethylene tow as used in Example 1 was dipped in this treating agent, squeezed by a stuffer crimper to a pick up of 10%, heat-treated for 2 hours at 140° C., and then cut to a length of 76 mm, and the percent crimp was 18%. The fibers so treated had the following characteristics.

| Slickness | $\mu s$ | 0.36 |
|---|---|---|
| | $\mu d$ | 0.30 |
| Compression elasticity | | |
| Compression rate | | 64% |
| Compression recovery | | 88% |
| Feel | Inferior to feather quilt (harsh feel) | |

EXAMPLE 2

The same procedure as in Example 1 was repeated except that the viscosity of the epoxysiloxane used in the treating agent A of Example 1 was varied as shown in Table 3. The results obtained are also shown in Table 3.

TABLE 3

| Run No. | 2-1 | 2-2 | 2-3 | 2-4 | 2-5 | 2-6 | 2-7 |
|---|---|---|---|---|---|---|---|
| Viscosity of epoxysiloxane | 500 | 1,000 | 3,000 | 8,000 | 10,000 | 100,000 | 150,000 |
| Slickness | | | | | | | |
| $\mu s$ | 0.23 | 0.19 | 0.17 | 0.18 | 0.19 | 0.19 | 0.24 |
| $\mu d$ | 0.25 | 0.19 | 0.19 | 0.19 | 0.20 | 0.21 | 0.26 |

TABLE 3-continued

| Run No. | 2-1 | 2-2 | 2-3 | 2-4 | 2-5 | 2-6 | 2-7 |
|---|---|---|---|---|---|---|---|
| Compression elasticity | | | | | | | |
| Compression rate (%) | 68 | 74 | 80 | 78 | 77 | 73 | 68 |
| Compression recovery (%) | 88 | 93 | 97 | 98 | 97 | 92 | 87 |
| Feel | Inferior to feather quilt (harsh) | | Similar to feather quilt | | | | Inferior to feather quilt (harsh) |

In can be seen from Table 3 that epoxysiloxanes having a viscosity of 1,000 to 100,000 centistokes gave especially good results and especially good results are obtained when the epoxysiloxane has a viscosity of 1,000 to 10,000 centistokes.

EXAMPLE 3

The same procedure as in Example 1 was repeated except that the epoxy group content of the epoxysiloxane used in the treating agent A in Example 1 was varied as shown in Table 3. The results are also shown in Table 4.

TABLE 4

| Run No. | 3-1 | 3-2 | 3-3 | 3-4 |
|---|---|---|---|---|
| Epoxy group content (wt. %) | 0.5 | 0.6 | 1.0 | 3.0 |
| Slickness | | | | |
| μ s | 0.24 | 0.20 | 0.16 | 0.17 |
| μ d | 0.25 | 0.21 | 0.16 | 0.16 |
| Compression elasticity | | | | |
| Compression rate (%) | 66 | 73 | 80 | 79 |
| Compression recovery (%) | 87 | 92 | 98 | 97 |
| Feel | Inferior to feather quilt (harsh) | Similar to feather quilt | | |

EXAMPLE 4

The same procedure as in Example 1 was repeated except that the ratio between the α-aminopropyl triethoxysilane and the epoxysiloxane used in the treating agent of Example 1 was changed as shown in Table 5. The results are shown in Table 5.

TABLE 5

| Run No. | 4-1 | 4-2 | 4-3 | 4-4 | 4-5 | 4-6 |
|---|---|---|---|---|---|---|
| Ratio* | 0.5 | 1 | 5 | 10 | 20 | 30 |
| Slickness | | | | | | |
| μ s | 0.24 | 0.18 | 0.18 | 0.16 | 0.18 | 0.25 |
| μ d | 0.25 | 0.19 | 0.17 | 0.16 | 0.19 | 0.26 |
| Compression elasticity | | | | | | |
| Compression rate (%) | 65 | 73 | 79 | 80 | 75 | 68 |
| Compression recovery (%) | 87 | 93 | 98 | 97 | 94 | 88 |
| Feel | Inferior to feather quilt (harsh) | Similar to feather quilt | | | | Inferior to feather quilt (harsh) |

*The weight in parts of the epoxysiloxane per part by weight of the α-aminopropyl triethoxysilane. The other components of the treating agent were the same as in Example 1.

Good results were obtained when the amount of the epoxysiloxane was 1 to 20 parts by weight per part by weight of the α-aminopropyltriethoxysilane.

EXAMPLE 5

The same procedure as in Example 1 was repeated except that each of the following epoxysiloxanes was used instead of the epoxysiloxane in the treating agent A in Example 1.

Epoxysiloxane-(2) composed of structural units of the following formulae

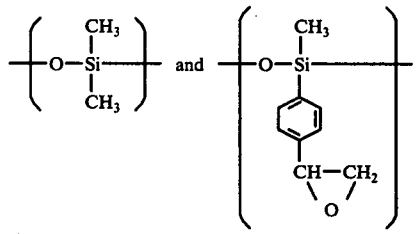

having a viscosity of 5,000 centistokes at 25° C. and an epoxy group content of 1.8% by weight with both ends being trimethylsilyl group [—Si(CH$_3$)$_3$].

Epoxysiloxane -(3) composed of structural units of the following formula

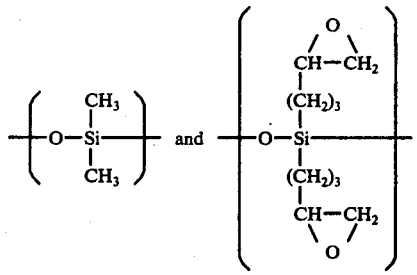

and having a viscosity of 10,000 centistokes at 25° C and an epoxy group content of 2% by weight with both ends being trimethylsilyl groups [—SI(CH$_3$)$_3$].

The results are shown in Table 6 below.

TABLE 6

| Run No. | 5-1 | 5-2 |
|---|---|---|
| Treating agents | | |
| α-Aminopropyl triethoxysilane | 0.5 | 0.9 |
| Epoxysiloxane-(2) | 4.9 | |
| Epoxysiloxane-(3) | | 4.5 |
| Cetyl phosphate potassium salt | 1.1 | 1.1 |
| Polyoxyethylene (10 Mols) nonyl phenol ether | 0.5 | 0.5 |
| Water | 93.0 | 93.0 |
| Slickness | | |
| μ s | 0.18 | 0.16 |
| μ d | 0.19 | 0.17 |
| Compression elasticity | | |
| Compression rate (%) | 75 | 79 |
| Compression recovery (%) | 94 | 96 |
| Feel | Similar to feather quilt | |

EXAMPLE 6

Polyethylene terephthalate having an intrinsic viscosity of 0.62 (calculated from the measured value in o-chlorophenol at 35° C) was melt spun and drawn to form a tow with a total denier of 500,000 (single fiber denier of 3). The tow was immersed in an emulsion of the following recipe, squeezed by a stuffer crimper to a pick-up of 6%, dried at 90° C for 20 minutes, then heat-treated at 140° C for 30 minutes, and cut to a length of 56 mm.

The number of crimps of the resulting fibers was 9 per 25 mm, and the percent crimp was 15%. The fibers so treated had the following properties.

| Recipe for the treating agent | |
|---|---|
| α-Aminopropyltriethoxysilane | 1.0 parts by weight |
| Epoxysilane (same as in Example 1) | 6.6 parts by weight |
| Cetylphosphate potassium salt | 1.6 parts by weight |
| Polyoxyethylene (10 mols) nonyl phenol ether | 0.8 |
| Water | 90 |
| Properties of the fibers | |
| Slickness | |
| $\mu$ s | 0.17 |
| $\mu$ d | 0.17 |
| Compression elasticity | |
| Compression rate | 82 |
| Compression recovery | 92 |
| Feel | Similar to feather quilt |

EXAMPLE 7

Polyethylene terephthalate having an intrinsic viscosity, as calculated from the measured value in o-chlorophenol at 35° C., of 0.62 was melt spun and drawn to form a tow having a total denier of 400,000 consisting of hollow fibers each with 7 denier and a hollowness of 13%. The resulting tow was treated with the treating agent A in Example 1 in the same way as in Example 1. The number of crimps of the resulting fibers was 8 per 25 mm, and the percent crimp was 19%. The fibers so treated had the following characteristics.

| Slickness | |
|---|---|
| $\mu$ s | 0.16 |
| $\mu$ d | 0.16 |
| Compression elasticity | |
| Compression rate | 78 |
| Compression recovery | 98 |
| Feel | Similar to feather quilt |

EXAMPLE 8

Polyethylene terephthalate having an intrinsic viscosity, as calculated from the measured value in o-chlorophenol at 35° C., of 0.65 and polyethylene terephthalate isophthalate (10 mol% of isophthalic acid copolymerized therein) were co-spum at a weight ratio of 1:1 using a side-by-side type spinneret, and drawn to 3.3 times the original length in warm water kept at 75° C. to form a tow with a total denier of 80,000 (a single fiber denier of 6.8). The tow was heat-treated in the relaxed state in air at 80° C., and dipped in the treating agent A of Example 1. It was then squeezed by a stuffer crimper to a pick-up of 12%, and dried at 80° C. for 30 minutes. It was then heat-treated in the relaxed state at 160° C. for 30 minutes to develop crimps and heat-set them at the same time, followed by cutting the tow to a fiber length of 76 mm.

The number of crimps of the resulting fibers was 12 per 25 mm, and the percent crimp was 19%. The fibers had the following characteristics.

| Slickness | |
|---|---|
| $\mu$ s | 0.18 |
| $\mu$ d | 0.17 |
| Compression elasticity | |
| Compression rate | 76 |
| Compression recovery | 98 |
| Feel | Similar to feather quilt |

EXAMPLE 9

Modified polyethylene terephthalate having an intrinsic viscosity, as calculated from the measured value in o-chlorophenol at 35° C., of 0.55 and containing 14% by weight of a fire-retardant of the following formula

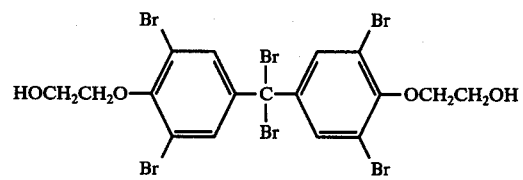

was melt-spun, and drawn to form a tow with a total denier of 400,000 (a single fiber denier of 5.5). The resulting two was dipped in the treating agent A of Example 1, squeezed by a stuffer crimper to a pick-up of 8%, then subjected to the same treatment as in Example 1.

The resulting fibers gave filling fibers having a soft feel similar to that of feather quilt and a high level of fire retardancy.

| Slickness | |
|---|---|
| $\mu$ s | 0.19 |
| $\mu$ d | 0.19 |
| Compression elasticity | |
| Compression rate | 74 |
| Compression recovery | 98 |

What we claim is:

1. Filling organic synthetic fibers coated with a heat-treated product of a treating agent comprising (a) 1 part by weight of an aminosilane of the formula (I)

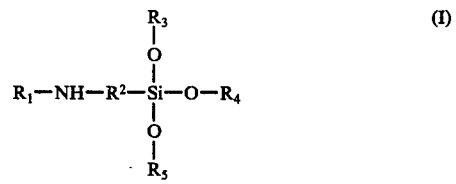

wherein $R_1$ is a hydrogen atom, an alkyl group containing 1 to 4 carbon atoms, or a phenyl group, $R_2$ is an alkylene group containing 1 to 4 carbon atoms, and $R_3$, $R_4$ and $R_5$, independently from each other, represent an alkyl group containing 1 to 4 carbon atoms, and (b) 1 to 20 parts by weight of an epoxysiloxane containing at least one structural unit of the formula (II)

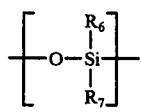

wherein $R_6$ and $R_7$, independently from each other, represent an alkyl group containing 1 to 3 carbon atoms, and at least two structural units of the formula (III)

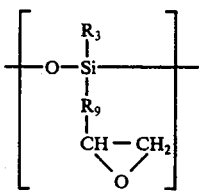

wherein $R_8$ is an alkyl group containing 1 to 3 carbon atoms or the group

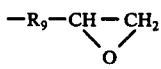

$R_9$ being an alkylene group containing 2 to 5 carbon atoms or a substituted or unsubstitued arylene group containing 6 to 10 carbon atoms.

2. The filling organic synthetic fibers of claim 1 wherein said fibers satisfy the following relationships:

$1.5 \leq D \leq 10$ $10D - 20 \leq L \leq 10D + 60$ $10 \leq L$ $-\tfrac{3}{2}D + 10.0 \leq C_N \leq -\tfrac{3}{2}D + 15.5$ $15 \leq C_N + C_D \leq 32$ wherein R is the denier size of the synthetic fibers, L is the length of the fibers in mm.

3. The filling organic synthetic fibers of claim 1 wherein said aminosilane is selected from the group consisting of α-aminopropyl triethoxysilane, α-aminopropyl trimethoxysilane, β-methylaminoethyl triethoxysilane and α-phenylaminopropyl trimethoxysilane.

4. The filling organic synthetic fibers of claim 1 aherein said epoxysioxane has a viscosity of 1,000 to 100,000 centistokes at 25° C.

5. The filling organic synthetic fibers of claim 1 wherein said epoxysiloxane contains 0.6 to 10% by weight of epox groups based on the total weight thereof.

6. The filling organic synthetic fibers of claim 1 wherein the proportion of said epoxysiloxane is 1 to 18 parts by weight per part by weight of said aminoslilane.

7. The filling organic synthetic fibers of claim 1 wherein the treating agent is in the form of an aqueous emulsion.

8. The filling organic synthetic fibers of claim 1 wherein the total amount of said aminosilane and epoxysiloxane adhered becomes 0.1 to 3.0% by weight based on the dry weight of the fibers.

9. The filling organic synthetic fibers of claim 1 wherein said organic synthetic fibers are polyester synthetic fibers.

* * * * *

UNITED STATES PATENT AND TRADEMARK OFFICE
CERTIFICATE OF CORRECTION

PATENT NO. : 4,062,999
DATED : December 13, 1977
INVENTOR(S) : Kondo, et al.

It is certified that error appears in the above-identified patent and that said Letters Patent are hereby corrected as shown below:

Item [57], line 9, formula (III), delete

"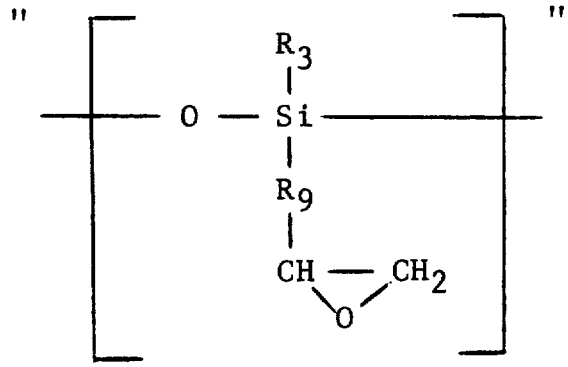", insert

-- 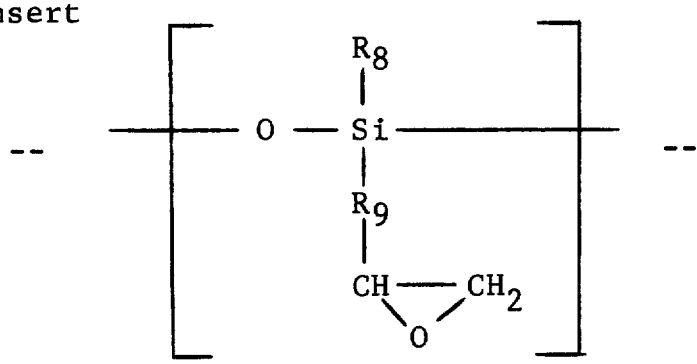 --

UNITED STATES PATENT AND TRADEMARK OFFICE
CERTIFICATE OF CORRECTION

PATENT NO. : 4,062,999
DATED : December 13, 1977
INVENTOR(S) : Kondo, et al.

It is certified that error appears in the above-identified patent and that said Letters Patent are hereby corrected as shown below:

Claim 1, line 17, formula (III), delete

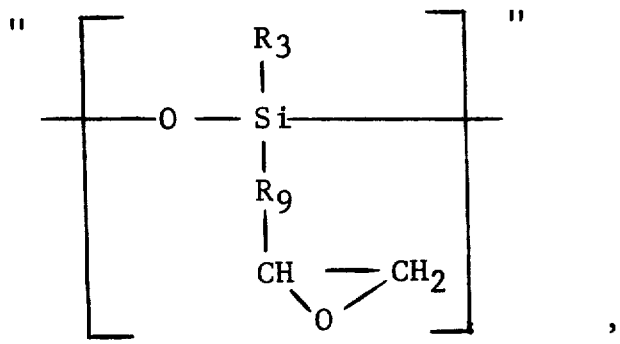

, insert

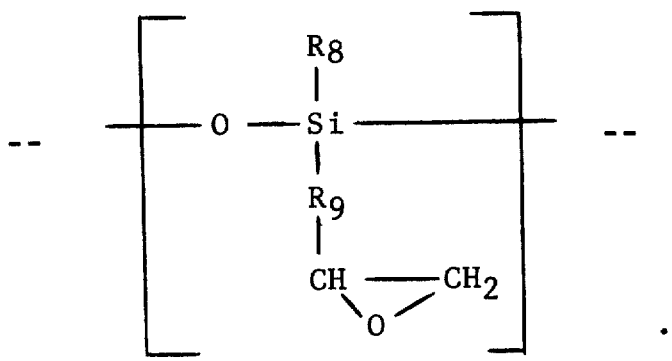

.

UNITED STATES PATENT AND TRADEMARK OFFICE
CERTIFICATE OF CORRECTION

PATENT NO. : 4,062,999
DATED : December 13, 1977
INVENTOR(S) : Kondo, et al.

It is certified that error appears in the above-identified patent and that said Letters Patent are hereby corrected as shown below:

Claim 2, line 8, delete "R", insert --D--.

Claim 2, line 9, delete "mm.", insert --mm, $C_N$ is the number of crimps per 25 mm, and $C_D$ is the percent crimp (%).--

Claim 4, line 2, delete "aherein", insert --wherein--.

Claim 4, line 2, delete "epoxysioxane", insert --epoxysiloxane--.

Claim 5, line 3, delete "epox", insert --epoxy--.

Signed and Sealed this

Twentieth Day of June 1978

[SEAL]

Attest:

RUTH C. MASON
Attesting Officer

DONALD W. BANNER
Commissioner of Patents and Trademarks